United States Patent [19]

Wester

[11] 4,193,111

[45] Mar. 11, 1980

[54] UNITY POWER FACTOR CONVERTER

[75] Inventor: Gene W. Wester, Pasadena, Calif.

[73] Assignee: California Institute of Technology, Pasadena, Calif.

[21] Appl. No.: 913,888

[22] Filed: Jun. 8, 1978

[51] Int. Cl.² .......................................... H02M 7/70
[52] U.S. Cl. ................................. 363/84; 363/89; 363/126; 323/102
[58] Field of Search ............... 323/102, 105, 119, 123, 323/124; 363/84, 85, 89, 126, 127; 318/438; 104/148 R, 148 LM

[56] References Cited

U.S. PATENT DOCUMENTS

| | | | |
|---|---|---|---|
| 3,896,348 | 7/1975 | Loderer | 323/102 X |
| 3,909,698 | 9/1975 | Nill | 323/119 X |
| 3,961,152 | 6/1976 | Staats | 363/126 X |
| 4,009,433 | 2/1977 | Möltgen | 323/102 |
| 4,013,937 | 3/1977 | Pelly et al. | 323/102 X |
| 4,119,907 | 10/1978 | Quinn | 323/105 |

*Primary Examiner*—William M. Shoop
*Attorney, Agent, or Firm*—Freilich, Hornbaker, Wasserman, Rosen & Fernandez

[57] ABSTRACT

A unity power factor converter capable of effecting either inversion (dc-to-dc) or rectification (ac-to-dc), and capable of providing bilateral power control from a DC source (or load) through an AC transmission line to a DC load (or source) for power flow in either direction, is comprised of comparators for comparing the AC current i with an AC signal $i_{ref}$ (or its phase inversion) derived from the AC ports to generate control signals to operate a switch control circuit for high speed switching to shape the AC current waveform to a sine waveform, and synchronize it in phase and frequency with the AC voltage at the AC ports, by selectively switching the connections to a series inductor as required to increase or decrease the current i.

10 Claims, 6 Drawing Figures

UNITY POWER FACTOR CONVERTER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to apparatus for achieving unity power factor for electrical loads, and more particularly to an ac-to-dc or dc-to-ac converter with unity power factor at the AC port. Electric utility companies are vitally concerned about characteristics of user load currents because phase displacement of the waveforms of current with respect to supplied voltage waveforms create undesirable power-transmission losses resulting in a low power factor.

The term power factor, used to characterize transmission efficiency and to indicate how well the supplied power is utilized, is defined as the ratio of actual power to the product of effective voltage and current. For maximum efficiency of transmission of AC power, the voltage and current must be in phase at both the source and the load end of the transmission line.

The maximum power factor is unity. Practical values, however, are often much lower due to reactive loads. Utility companies at times discourage large users of power from creating low power factors by assessing a rate penalty which is based upon measured power factor. In other cases, the utility company may add inverse reactance at the load to compensate for load reactance, but that approach for increasing the power factor makes use of resonant circuits tuned to the fundamental line frequency, which requires reactive components that are extremely large and heavy. Furthermore, changes of load reactance lead to decreased power factor because compensation reactance is fixed.

Some applications require conversion of AC source power to DC load power. Battery chargers and ac-to-dc converters for control of variable speed DC motors or for DC power distribution, are examples. Supplementary AC utility power is sometimes generated from DC sources, such as solar arrays, fuel cells, etc. The dc-to-ac or ac-to-dc converters degrade power transmission if unity power factor is not obtained. Conventional converters use rectifiers or switches with firing-angle delay to control voltage conversion. Such methods result in low power factor and have the added disadvantage of requiring low-frequency filtering components, which also are large and heavy.

Power transmission losses can be minimized if the power factor of the converter itself can be adjusted to unity, instead of providing compensation to the utility power line to accommodate converters with poor power factors. Some efforts to develop converters with unity power factor for such large loads as railway electric locomotives are being made. One converter operates with AC current pulses occuring at the fundamental frequency of the utility line. These pulses are symmetric with respect to peak AC voltage, but the pulsating current generates high electromagnetic interference (EMI). In a second converter, developed for a constant-voltage application, inductance in series with the AC line smooths high-frequency voltage pulses in the converter to provide low EMI and low harmonic content while maintaining high power factor. This second converter is described in a paper presented at the 1977 IEEE International Semiconductor Power Conversion Conference by Hans Kielgas and Reiner Nill titled "Converter Propulsion Systems with 3-Phase Induction Motors For Electric Traction Vehicles". In a third converter, inductance is used in the DC line as well as in the AC line to filter internal high-frequency pulses. Very little is known about this third converter, and it has not been field tested. All of these converters operate only with a fixed DC bus, and this imposes severe limitations on potential applications.

The approach of the second converter referred to above appears to have the greatest promise. A low-power transistorized ac-to-dc converter was assembled to examine the feasibility of extending applications to include adjustable DC voltage. It was found that an important restriction on this approach originates not from the controller but from the power stage configuration. DC voltage must be greater than peak AC voltage to control peak AC current. Otherwise, current can rise to the short-circuit value, limited only by the reactance of the inductor. Limiting short-circuit current with inductance is not practical in many cases because of the large inductor required. The significance of this consideration is to preclude use of the circuit in the important class of applications that require control of the AC current at low DC voltages, e.g. full range control of DC motors. A converter which removes these and other constraints, and makes possible simplified load power factor correction to unity can have significant impact on electrical power conservation, is the subject of this application.

SUMMARY OF THE INVENTION

In accordance with the present invention, a converter is provided which so controls ac-to-dc or dc-to-ac conversion that the voltage across an inductor coupling AC ports to a storage capacitor through full wave rectifying diodes will cause the current through the inductor into the capacitor to follow a reference current, $i_{ref}$, where the reference current is proportional to and in phase with the voltage, e, across the AC ports. The current, i, into the converter is thus controlled to be in phase with the voltage, e, across the AC ports, a condition required for unity power factor. The control is achieved by selectively operating switches to effectively connect the inductor, $L_1$, to the positive or negative terminal ($+V_c$ or $-V_c$) of the storage capacitor, or to zero volts, depending upon whether i is greater or less than $i_{ref}$, and depending upon whether e is positive or negative. While e is positive, it is connected to zero volts if $i < i_{ref}$ within the hysteresis tolerance of a comparator, and to the positive terminal of the capacitor if $i > i_{ref}$, and while e is negative, it is connected to zero volts when $i > i_{ref}$ and to the negative terminal of the capacitor if $i < i_{ref}$. In that manner i is forced to follow $i_{ref}$ within the hysteris tolerance of the comparator.

The novel features that are considered characteristic of this invention are set forth with particularity in the appended claims. The invention will best be understood from the following description when read in connection with the accompanying drawings.

DESCRIPTION OF PREFERRED EMBODIMENTS

The new dc-to-ac or ac-to-dc converter circuit to be described makes it possible to attain operation with unity power factor by the use of high frequency switching which is responsive to a control signal to regulate the waveform and phase displacement of the AC port current. The arrangement shapes the AC current waveform to a sinusoidal waveform and synchronizes it in phase and frequency with the AC voltage. Distortion is minimized by attenuating the fundamental and all harmonics of the switching frequency using small filters at the AC and DC ports. This is in contrast to the much larger filters required for use with resonant circuits operating at line frequency. The arrangement generates a low EMI.

Figure 1:
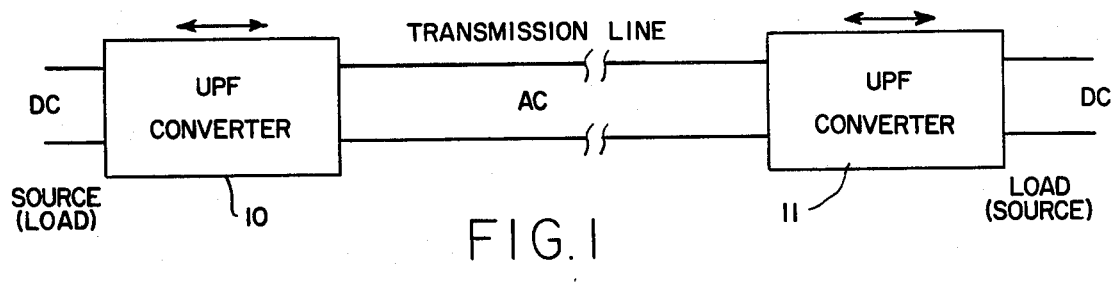
FIG. 1 is a block diagram illustrating the manner in which a unity power factor (UPF) converter constructed according to the present invention is used.

The circuit and its operating theory are described below. The new arrangement is capable of effecting either inversion (dc-to-ac) or rectification (ac-to-dc), and also has the unique capability to provide bilateral power control in the manner indicated in FIG. 1, for power flow in either direction between a unity power factor (UPF) converter 10 and a UPF converter 11.

Potential applications are seen for interfacing AC and DC transmission lines; for integration with utility power grids receiving supplementary ac power from distributed DC power sources such as batteries, solar arrays, fuel cells, RTGs, and rotary electrical generators powered by wind, engine or heat; for load leveling using electrical power from various sources including those mentioned; for full range, smooth speed control of large and small DC motors, with or without regeneration capability from AC sources; for operation of electric trains and vehicles, and for industrial process control. The arrangement also makes it possible to operate with a DC voltage which can be adjusted higher or lower than the peak AC voltage.

Figure 2:
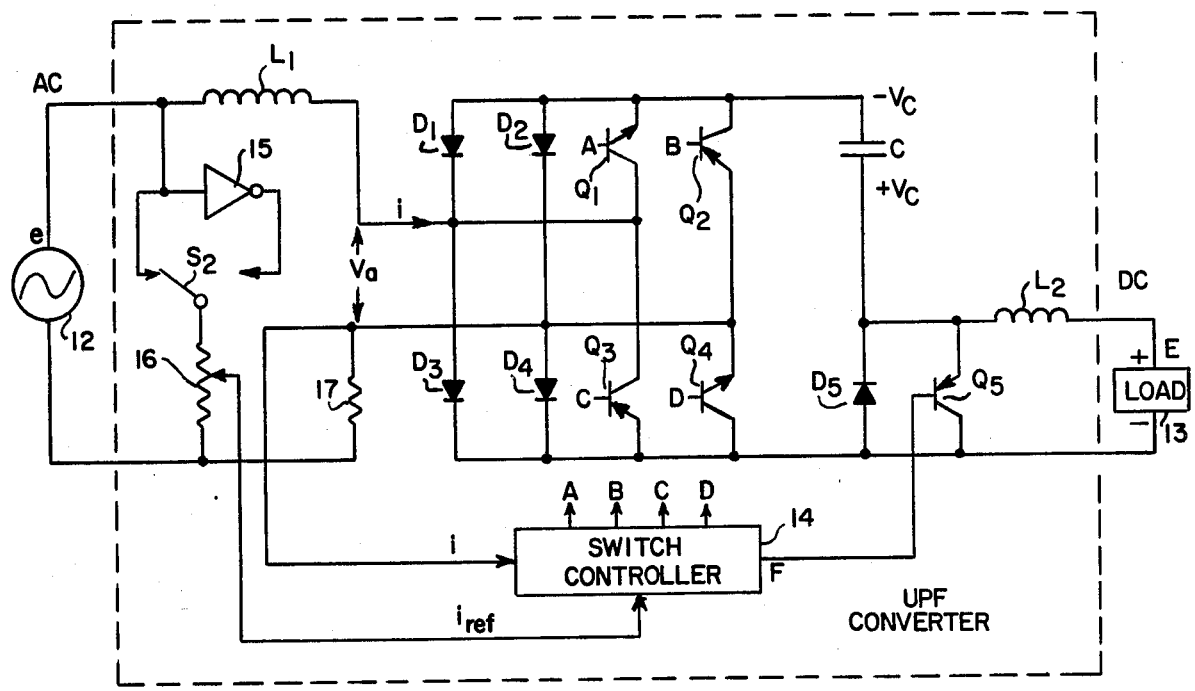
FIG. 2 is a schematic diagram illustrating an exemplary embodiment of the present invention.
Figure 3:
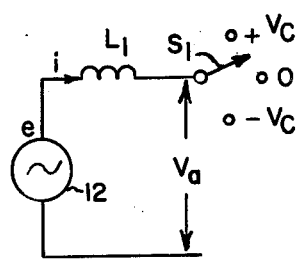
FIG. 3 illustrates schematically a switch which represents the action of electronic switches in the circuit of FIG. 2.
Figure 4A:
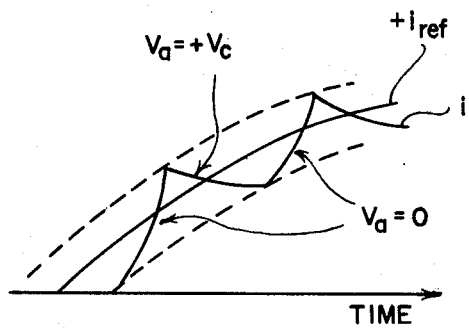
FIGS. 4a and 4b are graphs useful in understanding the present invention.
Figure 4B:
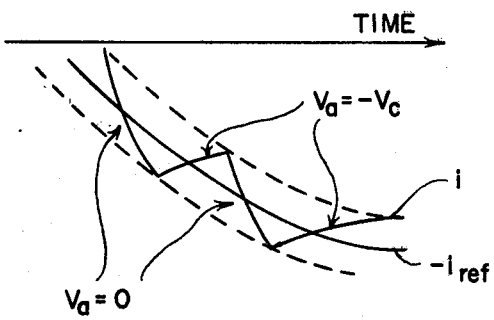

A simplified schematic of a unity power factor converter is shown in FIG. 2. The AC voltage and current at AC ports, and DC voltage at DC ports are respectively designated as e, i and E. In response to sensed signals $i_{ref} \approx e$, and i the controller determines which of the transistor switches $Q_1$ through $Q_5$ are to be turned on to emulate the action of a switch S, indicated in FIG. 3 which is shifted from the nominal 0 position to either the $+V_c$ or the $-V_c$ position or from one of those positions to another, in order to make i proportional to e within a hysteresis band indicated in FIG. 4a for the special case of e positive, which is to connect the switch to 0 if i is less than $i_{ref}$, where $i_{ref}$ is proportional to e, and to $+V_c$ if i is greater than $i_{ref}$. While e is negative, the switch is connected to 0 if i is greater than $i_{ref}$, and to $-V_c$ if i is less than $i_{ref}$ as shown in FIG. 4b. Nominal 0 is, of course circuit ground and $+V_c$ and $-V_c$ are the positive and negative terminals of a storage capacitor C. Inductor $L_1$ limits the rate at which i changes and maintains continuous AC current flow. An inductor $L_2$ similarly limits the rate at which current to the DC ports changes. In practice, a small low-pass filter at the AC port would be sufficient to attenuate high-frequency ripple components of i resulting from the switchings within the hysteresis band at the high frequency rate which is chosen for that purpose, leaving only the desired fundamental frequency component. The AC current amplitude is completely determined by the controller and is adjustable through patentiometer 16. It is independent of inductance, AC frequency and DC voltage amplitude, so controllability is excellent.

Referring again to FIG. 2, the unity power factor converter is shown coupling an AC source (or load) 12 to a DC load (or source) 13. It should thus be understood that the converter may be used to couple a DC source to an AC load as well as an AC source to a DC load. In either case, transistors $Q_1$ through $Q_5$ are switched at a high frequency by a controller 14 to produce unity power factor at the AC port by causing AC current, i, to be in phase with AC voltage, e. In other words the control unit determines the switching necessary to create a sinusoidal AC current waveform that is synchronized in frequency and phase with the AC voltage across the AC source (or load).

For convenience in describing the organization and operation of the converter, reference will only be made to converting an AC voltage from a source to a load, it being understood that, under the reciprocal-energy theorem, a DC voltage, E, may be applied at the DC ports and an AC current derived at the AC ports with the current still controlled to be in phase with the voltage at the AC ports. In other words, the converter to be described as an ac-to-dc converter is a reciprocal converter. All that is necessary to operate it as a dc-to-ac converter is to effectively connect the AC ports to the controller 14 through an inverter 15. A switch $S_2$ is shown for that purpose, but in practice a converter would be dedicated to either ac-to-dc or dc-to-ac conversion at the time of final assembly, although if all converters are assembled as dc-to-ac, they can be dedicated to a use for ac-to-dc conversion by simply removing the inverter and substituting a direct connecting lead. In either case, the voltage e across the AC ports is tapped through a potentiometer 16 to provide a singal, $i_{ref}$, to compare with the signal i in the controller 14.

As noted hereinbefore, an inductor $L_1$ is employed to couple the AC source to the storage capacitor C, and an inductor $L_2$ is employed to couple the storage capacitor to the load. These function as filters to attenuate the fundamental and all harmonics of the switching frequency to minimize distortion. Four diodes $D_1$ through $D_4$ are connected in a bridge network across the AC port to provide full-wave rectification. The output of the bridge is connected to the storage capacitor C in series with the transistor $Q_5$ and with a diode $D_5$ that is in parallel with the transistor $Q_5$. The transistors $Q_1$ through $Q_4$ are also connected in a bridge circuit across the AC ports with the respective transistors $Q_1$ through $Q_4$ in parallel with the diodes $D_1$ through $D_4$. By itself, the diode bridge would rectify the AC input voltage to charge the capacitor with the polarity shown for positive DC output to the load. However, the various transistors are selectively switched at high frequency to so shunt the diodes in the bridge, and the diode $D_5$ as to cause the current i through the inductor $L_1$ to follow the reference current, $i_{ref}$, derived from the source voltage e, and synchronized in phase and frequency with the source voltage e. Once the current i is caused to be in phase with the voltage e, the condition required for unity power factor is achieved.

The scheme described with reference to FIGS. 4a and 4b for the controller 14 may be implemented in a number of ways that will readily occur to one skilled in the art. For example, a saturable operational amplifier (comparator) could be used to continually monitor the polarity of the signal e and produce a logic level 1 when positive and a logic level 0 when negative. The current signal i could then be compared with the current signal $i_{ref}$ using a simple differential amplifier circuit which performs the function, $$E_o = A(E_2 - E_1)$$

where $E_2$ is proportional to $i_{ref}$ and $E_1$ is proportional to i, followed by a saturable operational amplifier which again yields a logic level 1 when positive, i.e. when $i < i_{ref}$, and a logic level 0 when negative, i.e., when $i > i_{ref}$. The controller logic could then be implemented in accordance with the following table.

| e | $i < i_{ref}$ | $V_a$ |
|---|---|---|
| + | + (true) | 0 |
| + | − (false) | $+V_c$ |
| − | + (true) | $-V_c$ |
| − | − (false) | 0 |

Figure 5:
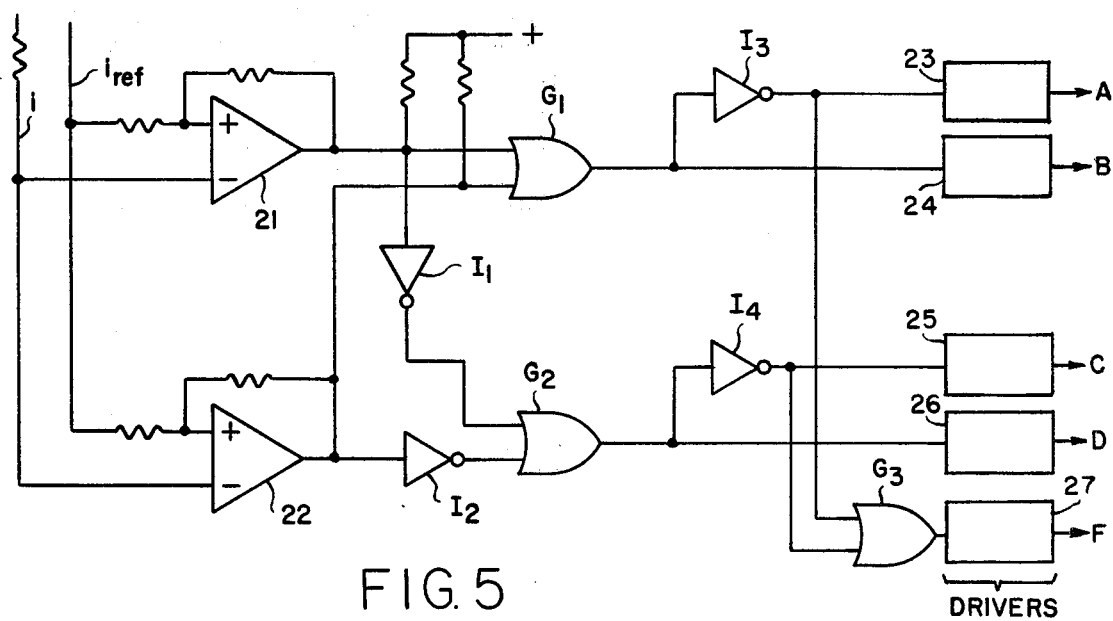
FIG. 5 is an exemplary logic diagram of a specific exemplary embodiment of the switch controller in FIG. 2.

An alternative implementation for the switch controller 14, which is preferred because of the manner in which voltage signals proportional to the signals i and $i_{ref}$ are derived in FIG. 2, will now be described with reference to FIG. 5. An advantage of this preferred implementation is that it is then not necessary to monitor the polarity of the voltage, e. Instead, two comparators 21 and 22 are employed to compare the current i with the reference current $i_{ref}$ which is proportional to and in phase with the voltage e. The first comparator 21 has a narrow hysteresis, and it performs essentially the same function as the current comparator in the scheme discussed above. The second comparator 22 has a wider hysteresis for the purpose of determining by inference whether the sign of the voltage e is positive or negative. Assuming the following hysteresis levels:

| | |
|---|---|
| − − − − | $i^{++}$ |
| − − − − | $i^{+}$ |
| ———— | $i_{ref}$ |
| − − − − | $i^{-}$ |
| − − − − | $i^{--}$ | where $i^+$ and $i^-$ correspond to the hysteresis levels of the comparator 21 with narrow hysteresis relative to the reference signal, and $i^{++}$ and $i^{--}$ correspond to a reference comparator 22 with wider hysteresis relative to the reference, crossing or exceeding these hysteresis levels with the signal i as it is compared with the reference $i_{ref}$ will produce the conditions of the following table where $i_1 \equiv i^+, i^-$ and $i_2 \equiv i^{++}, i^{--}$

| $i_1$ | $i_2$ | $V_a$ | $Q_1$ | $Q_2$ | $Q_3$ | $Q_4$ | $Q_5$ |
|---|---|---|---|---|---|---|---|
| $i^-$ | $i^{--}$ | $+V_c$ | 0 | 1 | 1 | 0 | 1 |
| $i^+$ | $i^{--}$ | 0 | 1 | 0 | 1 | 1 | 0 |
| $i^+$ | $i^{++}$ | $-V_c$ | 1 | 0 | 0 | 1 | 1 |
| $i^-$ | $i^{++}$ | 0 | 1 | 0 | 1 | 1 | 0 |

When the sign of both comparators is negative, i.e., when $i^+$ and $i^{++}$ are both exceeded transistor switches $Q_2$, $Q_3$ and $Q_5$ are closed to connect terminal $+V_c$ of the storage capacitor to the inductor $L_1$. When the sign of both comparators is positive, i.e., when $i^-$ and $i^{--}$ are both exceeded, the transistor switches $Q_1$, $Q_4$ and $Q_5$ are closed to connect terminal $-V_c$ of the storage capacitor to the inductor $L_1$. At all other times transistor switches $Q_1$, $Q_3$ and $Q_4$ are closed to connect the inductor to the current return line, thus avoiding any contribution of positive or negative current from the storage capacitor. An exemplary logic network for implementing this table is shown in FIG. 5. For example, if the outputs of both comparators 21 and 22 are "positive", i.e., logic level 1 for $i^-$ and $i^{--}$ exceeded, gates $G_1$ to $G_3$ and inverters $I_1$ to $I_4$ cooperate with drivers 23 through 27 to produce the signals A, B, C, D and $\overline{F}$. Similarly, if both outputs are "negative", i.e., logic level 0 for $i^+$ and $i^{++}$ exceeded they cooperate to produce signals $\overline{A}$, $\overline{B}$, $\overline{C}$, $\overline{D}$ and F. The other combinations follow logically, but in following the logic through, it should be noted that transistors $Q_1$ and $Q_4$ are npn transistors which require a logic 1 signal to turn them on, while all other transistors are pnp transistors which require a logic 0 signal to turn them on. The drivers 24, 25 and 27 include an inverting stage at the output while the drivers 23 and 26 do not in order to maintain the proper signal drive levels to turn the transistors on selectively in the implementation shown.

In summary, diodes $D_1$ through $D_4$ provide a diode bridge for full wave rectification. One output terminal of the bridge is connected directly to the negative $(-V_c)$ terminal of the storage capacitor C, and the other is connected to the positive $(+V_c)$ terminal of the storage capacitor by a fifth diode $D_5$. The transistors $Q_1$ through $Q_5$ connected in parallel with respective diodes $D_1$ through $D_5$ are selectively turned on to shunt the diodes and thus selectively connect the inductor $L_1$ to the positive $(+V_c)$ and negative $(-V_c)$ terminals of the capacitor, or to the return current path (0) through a resistor 17.

The terminal, $+V_c$ is connected to the inductance $L_1$ by turning on transistors $Q_3$ and $Q_5$ while the terminal $-V_c$ is connected to a return current path through the resistor 17 by turning on transistor $Q_2$. To connect $-V_c$ to the inductance $L_1$, transistor $Q_1$ is turned on while transistors $Q_4$ and $Q_5$ are also turned on to connect $+V_c$ to the return current path. To effectively connect 0 to the inductor, transistors $Q_1$, $Q_3$ and $Q_4$ are turned on. In that manner the transistors $Q_1$ through $Q_5$ implement the operation of the switch $S_1$ illustrated in FIG. 3. There may, of course, be other combinations of transistors turned on to achieve the same results, but it is important to note that without transistor $Q_5$, it is not possible to selectively connect $+V_c$, 0 or $-V_c$ to the inductance $L_1$. For instance, to connect 0, transistors $Q_1$ and $Q_2$ may be turned on, while transistor $Q_5$ is held off, instead of transistors $Q_1$, $Q_3$ and $Q_4$. Consequently, the switch control logic may be implemented in other ways than that shown. There are several advantages of this arrangement over that of Reiner and Nill, supra. This arrangement will permit the voltage at the DC ports to go to zeo under some feedback load control, and will provide for bidirectional power flow, i.e., provide for either AC to DC conversion (rectification) or DC to AC conversion (inversion) with unity power factor at the AC ports, i.e., with the current i in phase with the voltage e at the AC ports. All that is required for the latter (inversion) is for the phase of the signal $i_{ref}$ that is proportional to e to be 180° out of phase with e instead of in phase with e.

Although particular embodiments of the invention have been described and illustrated herein, it is recognized that modifications and variations may readily occur to those skilled in the art. It is therefore intended that the claims be interpreted to cover such modifications and variations.

What is claimed is:

1. A unity power factor conversion circuit, capable of effecting either dc-to-ac or ac-to-dc conversion, and capable of providing bilateral power control from a DC source, or load, at DC ports to an AC load, or source, at AC ports using a storage capacitor and a full wave rectifier to store energy in said capacitor from said AC ports, said circuit having a first inductor to couple said AC ports to said capacitor and a second inductor to couple said DC ports to said capacitor, means for selectively switching at high speed said first inductor to $+V_c$ at a positive terminal of said capacitor, $-V_c$ at a negative terminal of said capacitor, or to zero volts at a point on the current return path of said AC source, or load, and means responsive to a comparison of the current i through said first inductor with a reference current $i_{ref}$ proportional to and in a predetermined in phase or antiphase relationship with the voltage e of said AC source, or load, for controlling said high speed switching means to connect said first inductor to the positive or negative terminal of said storage capacitor, or to zero volts, depending upon whether i is greater or less than $i_{ref}$, and depending upon whether the voltage e is positive or negative, such that when e is positive, said first inductor is connected to zero volts if $i < i_{ref}$ and to the positive terminal of said capacitor if $i > i_{ref}$, and when e is negative, said first inductor is connected to zero volts when $i < i_{ref}$ and to the negative terminal of said capacitor if $i <$ ref, whereby the AC source, or load, current i is forced to follow the voltage e.

2. A unity power factor conversion circuit as defined in claim 1 wherein said reference current $i_{ref}$ is in phase with said voltage e for AC to DC conversion.

3. A unity power factor conversion circuit as defined in claim 1 wherein said reference current $i_{ref}$ is in antiphase with said voltage e for DC to AC conversion.

4. A unity power factor conversion circuit as defined in claim 2 with a second circuit identical to the first, except that the second includes means for inverting the phase of the reference current $i_{ref}$, and an AC transmission line connecting the two circuits at their AC ports to transmit power from a DC source connected to the second circuit to a DC load connected to the first circuit.

5. A unity power factor converter having two AC terminals and two DC terminals comprising a storage capacitor,
an inductor,
a diode,
full-wave rectification means having two input terminals and two output terminals, one input terminal connected to one of said two AC terminals by said inductor and the other input terminal connected to the other of said AC input terminals, one output terminal connected to one terminal of said capacitor, and the other output terminal connected to both one DC terminal and the other terminal of said capacitor through said diode polarized to conduct current to said capacitor, DC filter means for coupling said other terminal of said capacitor to the other one of said DC terminals, electronic switching means for selectively connecting either said one terminal of said capacitor to said one input terminal of said rectifying means while the remaining terminal of said capacitor is connected to said other input terminal of said rectifying means, or said other terminal of said capacitor to said one input terminal of said rectifying means while the remaining terminal of said capacitor is connected to the said other terminal of said rectifying means, or to connect one input terminal of said rectifying means, or to connect one input terminal of said rectifying means to the other input terminal of said rectifying means, in response to control signals, means for deriving a reference signal proportional to the voltage across said AC terminals with a predetermined constant phase relationship, means for deriving a second signal proportional to current through said inductor, and control means for producing said control signals as a function of said reference signal and said second signal depending upon whether the second signal is greater or less than the reference signal, and depending upon whether the voltage across said AC terminals is of one polarity or the other, to force the second signal to follow the reference signal, whereby a predetermined phase relationship is maintained between current through said inductor and the voltage across said AC terminals, where said phase relationship is in phase for ac-to-dc inversion, and in antiphase for dc-to-ac conversion, with unity power factor conversion in either case.

6. A unity power factor converter as defined in claim 5 wherein said full-wave rectification means is comprised of a diode bridge comprised of four diodes, and said switching means is comprised of five transistors each connected in parallel with a different one of said one coupling diode and said four bridge diodes, each of said transistors being operative to conduct current in a direction opposite current through the diode across which it is connected to shunt the diode when the transistor is turned on.

7. A unity power factor converter as defined in claim 5 wherein said control means is comprised of a first comparator with narrow hysteresis and a second comparator with wider hysteresis, each of said first and second comparators being connected to said reference signal and said second signal to produce an output signal proportional to the reference signal minus the second signal, and logic means responsive to the output of both comparators to connect the one terminal of said capacitor to said inductor connected to one AC terminal when the output of said comparators are both positive and to connect the other terminal of said capacitor to the other AC terminal, to connect the other terminal of said capacitor to said inductor connected to one AC terminal when the output of said comparators are both negative and to connect the one terminal of said capacitor to the other AC terminal, and at all other times to connect the inductor connected to one AC terminal to the other AC terminals.

8. A unity power factor converter as defined in claim 7 wherein said fullwave rectification means is comprised of a diode bridge comprised of four diodes, and said switching means is comprised of five transistors each connected in parallel with a different one of said one coupling diode and said four bridge diodes, each of said transistors being operative to conduct current in a direction opposite current through the diode across which it is connected to shunt the diode when the transistor is turned on.

9. A unity power factor converter as defined in claim 8 wherein said phase relationship is in phase for ac-to-dc inversion.

10. A unity power factor converter as defined in claim 8 wherein said phase relationship is in antiphase for dc-to-ac conversion.

* * * * *